US012731829B2

(12) United States Patent
Yoon et al.

(10) Patent No.: US 12,731,829 B2
(45) Date of Patent: Sep. 8, 2026

(54) POUCH-SHAPED BATTERY CASE HAVING HIDDEN-TYPE GAS POCKET, POUCH-SHAPED SECONDARY BATTERY INCLUDING THE SAME, AND BATTERY MODULE INCLUDING THE SAME

(71) Applicant: LG Energy Solution, Ltd., Seoul (KR)

(72) Inventors: Han Ki Yoon, Daejeon (KR); Kye Yeon Ryu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 553 days.

(21) Appl. No.: 17/734,518

(22) Filed: May 2, 2022

(65) Prior Publication Data

US 2022/0328908 A1 Oct. 13, 2022

Related U.S. Application Data

(63) Continuation of application No. 16/619,687, filed as application No. PCT/KR2019/000244 on Jan. 8, 2019, now abandoned.

(30) Foreign Application Priority Data

Jan. 9, 2018 (KR) ........................ 10-2018-0002860

(51) Int. Cl.

*H01M 50/105* (2021.01)
*H01M 50/119* (2021.01)

(Continued)

(52) U.S. Cl.

CPC ........ *H01M 50/105* (2021.01); *H01M 50/119* (2021.01); *H01M 50/124* (2021.01); *H01M 2200/20* (2013.01)

(58) Field of Classification Search

CPC ............. H01M 50/105; H01M 50/342; H01M 50/3425; H01M 50/35; H01M 50/367;

(Continued)

(56) References Cited

U.S. PATENT DOCUMENTS

| | | | |
|---|---|---|---|
| 8,277,970 | B2 | 10/2012 | Yang et al. |
| 2003/0049527 | A1 | 3/2003 | Yageta et al. |

(Continued)

FOREIGN PATENT DOCUMENTS

| | | | |
|---|---|---|---|
| CN | 1527416 | A | 9/2004 |
| CN | 103199297 | A | 7/2013 |

(Continued)

OTHER PUBLICATIONS

Birke et al; "Description DE102009051315A1"; Machine translation of DE102009051315A1 obtained from ESpacenet Patent Translate (Year: 2009).*

(Continued)

*Primary Examiner* — Allison Bourke
*Assistant Examiner* — Charlene Bermudez
(74) *Attorney, Agent, or Firm* — Lerner David LLP

(57) ABSTRACT

A pouch-shaped battery case (and a pouch-shaped secondary battery including the same) includes a hidden-type gas pocket having a folded configuration such that, when gas is generated in the pouch-shaped case, the gas pocket unfolds to form a space for collecting the gas, whereby it is possible to reduce the extent of swelling of the battery when the gas is generated. The gas pocket may be configured so as not to occupy any space in a normal operating state of the battery, such that the gas pocket is unfolded to form the gas reception space only when the gas is generated, whereby it is possible to improve the efficiency of utilization of space in the battery.

18 Claims, 10 Drawing Sheets

(51) Int. Cl.
*H01M 50/124* (2021.01)
*H01M 50/186* (2021.01)
*H01M 50/30* (2021.01)

(58) Field of Classification Search
CPC .......... H01M 50/375; H01M 2200/20; H01M 10/0404; H01M 10/0481; H01M 50/392; H01M 50/609; H01M 50/618; H01M 50/136; H01M 50/317; H01M 50/358; H01M 50/394; H01M 50/325
See application file for complete search history.

(56) References Cited

U.S. PATENT DOCUMENTS

| | | | | |
|---|---|---|---|---|
| 2004/0175609 | A1 | 9/2004 | Yageta et al. | |
| 2006/0257732 | A1 * | 11/2006 | Yageta | H01M 50/1243 429/162 |
| 2010/0112436 | A1 | 5/2010 | Mizuta et al. | |
| 2012/0040235 | A1 | 2/2012 | Cho et al. | |
| 2014/0205869 | A1 | 7/2014 | Mizuta et al. | |
| 2014/0272488 | A1 | 9/2014 | Kim et al. | |
| 2017/0133707 | A1 | 5/2017 | Han et al. | |
| 2020/0358044 | A1 * | 11/2020 | Jang | H01M 50/557 |

FOREIGN PATENT DOCUMENTS

| | | | | |
|---|---|---|---|---|
| CN | 106486629 | A | 3/2017 | |
| DE | 102009051315 | A1 * | 7/2011 | H01M 10/613 |
| EP | 2131413 | A1 | 12/2009 | |
| JP | S60253150 | A | 12/1985 | |
| JP | H1055792 | A * | 8/1996 | Y02E 60/10 |
| JP | H11016595 | A | 1/1999 | |
| JP | 2000223086 | A | 8/2000 | |
| JP | 2011071133 | A | 4/2011 | |
| JP | 2013152939 | A | 8/2013 | |
| JP | 2013535791 | A | 9/2013 | |
| JP | 2016039095 | A | 3/2016 | |
| KR | 20080011477 | A | 2/2008 | |
| KR | 20100118394 | A | 11/2010 | |
| KR | 20110061293 | A | 6/2011 | |
| KR | 20110107448 | A | 10/2011 | |
| KR | 20120102935 | A | 9/2012 | |
| KR | 20130014253 | A | 2/2013 | |
| KR | 20130044705 | A * | 5/2013 | |
| KR | 20160020759 | A | 2/2016 | |
| KR | 20160059776 | A | 5/2016 | |
| KR | 20160088647 | A | 7/2016 | |
| WO | 2011051174 | A1 | 5/2011 | |

OTHER PUBLICATIONS

Mingzhe et al; "KR20130044705A Manufacturing Method of Pouch Type Secondary Battery"; Machine translation of KR20130044705A obtained from Google Patents (Year: 2013).*
Yoshihisa; "Thin Battery"; Machine translation of JP H1055792 A obtained from Clarivate Analytics (Year: 1996).*
Chinese Search Report for Application No. 201980002485.9 dated Sep. 30, 2021, 2 pages.
Extended European Search Report including Written Opinion for EP19738974.5 issued Oct. 23, 2020; 8 pages.
International Search Report for Application No. PCT/KR2019/0002444, mailed Apr. 18, 2019, pp. 1-3.

* cited by examiner (a)

(b)

(c)

POUCH-SHAPED BATTERY CASE HAVING HIDDEN-TYPE GAS POCKET, POUCH-SHAPED SECONDARY BATTERY INCLUDING THE SAME, AND BATTERY MODULE INCLUDING THE SAME

CROSS-REFERENCE TO RELATED APPLICATIONS

This application is a continuation of U.S. application Ser. No. 16/619,687, filed Dec. 5, 2019, which is a national phase entry under 35 U.S.C. § 371 of International Application No. PCT/KR2019/000244 filed Jan. 8, 2019, which claims priority from Korean Patent Application No. 10-2018-0002860 filed on Jan. 9, 2018, the disclosures of which are incorporated herein by reference in their entirety.

TECHNICAL FIELD

The present invention relates to a secondary battery, and more particularly to a pouch-shaped secondary battery having an electrode assembly mounted in a pouch-shaped battery case made of a laminate sheet and a battery module including the same.

BACKGROUND ART

In general, secondary batteries are batteries that can be charged and discharged, unlike primary batteries, which cannot be charged. Such secondary batteries have been widely used in electronic devices, such as cellular phones, laptop computers, and camcorders, or electric vehicles (EVs).

Among the secondary batteries, the use of lithium secondary batteries has been rapidly increasing, since the capacity of the lithium secondary battery is larger than the capacity of a nickel-cadmium battery or a nickel-hydride battery, which are mainly used as a power source for electronic devices, and the energy density of the lithium secondary battery per unit weight is high.

Such a lithium secondary battery mainly uses a lithium-based oxide and a carbon material as a positive electrode active material and a negative electrode active material, respectively. The lithium ion secondary battery is configured to have a structure in which a positive electrode sheet, to which the positive electrode active material is applied, and a negative electrode sheet, to which the negative electrode active material is applied, are disposed in the state in which a separator is interposed therebetween to constitute an electrode assembly and in which the electrode assembly is received in a sheathing member, i.e. a battery case, together with an electrolytic solution in a sealed state.

Depending on the shape of the battery case, the lithium secondary battery may be classified as a can-shaped secondary battery, configured such that the electrode assembly is mounted in a metal can, or a pouch-shaped secondary battery, configured such that the electrode assembly is mounted in a pouch made of an aluminum laminate sheet.

Meanwhile, the pouch-shaped secondary battery is classified as a unidirectional battery, configured such that electrode leads connected to positive electrode and negative electrode tabs of the electrode assembly are disposed at one side of the battery, or a bidirectional battery, configured such that electrode leads connected to positive electrode and negative electrode tabs of the electrode assembly are disposed at opposite sides of the battery.

In general, the pouch-shaped secondary battery includes an electrode assembly, a pouch-shaped case configured to receive the electrode assembly in a sealed state, and electrode leads extending from the electrode assembly so as to be exposed out of the pouch-shaped case.

In the pouch-shaped secondary battery described above, however, a large amount of gas is generated due to the decomposition of an electrolyte when the lifespan of the secondary battery expires, the secondary battery is overcharged, the secondary battery is exposed to high temperatures, or an internal short circuit occurs in the secondary battery, whereby the pouch-shaped case expands, i.e. a swelling phenomenon occurs. The swelling phenomenon, in which the middle portion of the pouch-shaped case swells due to gas that is generated in the pouch-shaped case, causes the deformation of the battery. As a result, a short circuit occurs in the battery. In severe cases, high pressure may be generated in the sealed case, whereby the electrolyte may be further decomposed, which may result in the explosion of the battery.

In order to solve the above problem, Korean Patent Application Publication No. 10-2016-0059776 and Korean Patent Application Publication No. 10-2011-0107448 disclose various technologies capable of dealing with the swelling phenomenon.

However, the conventional art, including the above Korean patent application publications, is configured to have a structure in which the interior space of a case is expanded in order to collect gas. As a result, the overall size of a battery is increased. In addition, since the expanded space is empty, the expanded space is weakly resistant to external force, whereby the expanded space may be easily deformed. In order to solve this problem, therefore, it is necessary to install an additional structure in the space in order to increase the rigidity of the space, which is another problem.

DISCLOSURE

Technical Problem

The present invention has been made in view of the above problems, and it is an object of the present invention to provide a pouch-shaped battery case having a hidden-type gas pocket, wherein the gas pocket is configured to be unfolded or expanded, when gas is generated, in order to form a gas reception space, whereby it is possible to reduce the extent of swelling of a battery when the gas is generated, and wherein the gas pocket is configured so as not to occupy any space in a normal state and to be unfolded only when the gas is generated in order to form the gas reception space, whereby it is possible to improve the efficiency of utilization of space in the battery. The present invention also provides a pouch-shaped secondary battery including the same, and a battery module including the same.

Technical Solution

In accordance with an aspect of the present invention, the above and other objects can be accomplished by the provision of a pouch-shaped secondary battery including an electrode assembly and a pouch-shaped case configured to receive the electrode assembly, wherein the pouch-shaped case has therein a gas pocket configured such that at least a portion of the gas pocket is maintained in a folded state and such that, when gas is generated in the pouch-shaped case, the gas pocket is unfolded to form a space configured to collect the gas.

Here, the gas pocket may be formed at a portion of the pouch-shaped case that is folded in order to cover the electrode assembly at a perimeter portion of the pouch-shaped case.

The pouch-shaped case may be configured to have a quadrangular planar structure, and in the case in which a perimetric surface of this quadrangular plane includes a single surface that is folded and three surfaces that are attached by sealing, the gas pocket may be formed at the single surface that is folded.

In addition, the gas pocket may be formed at a portion of the pouch-shaped case that is attached by sealing at the perimeter portion of the pouch-shaped case.

In addition, the gas pocket may be formed at at least one of opposite side surfaces of the pouch-shaped case.

The pouch-shaped case may include a case main body, in which the electrode assembly is mounted, and the gas pocket formed at one side of the case main body, and the gas pocket may be configured to have a structure in which the gas pocket is bent from the case main body into tight contact with the case main body.

The gas pocket may be configured to have a structure in which the gas pocket is bent multiple times into tight contact with the case main body.

The gas pocket may be configured to have a structure in which the gas pocket is bent so as to have a bellows structure that is in tight contact with the case main body.

In accordance with another aspect of the present invention, there is provided a pouch-shaped battery case including a case main body, in which an electrode assembly is mounted, and a gas pocket formed at at least one side of the case main body, wherein the gas pocket is configured such that the gas pocket is maintained in a folded state and such that, when gas is generated from the electrode assembly, the gas pocket is unfolded to form a space configured to collect the gas.

It is preferable that the gas pocket may be configured to have a structure in which the gas pocket is bent from the case main body into tight contact with the case main body.

In accordance with a further aspect of the present invention, there is provided a battery module including one or more pouch-shaped secondary batteries described above.

The principal technical solutions described above will be more concretely and definitely disclosed with reference to the following description of "best mode" and the accompanying drawings. In addition to the principal technical solutions, various other technical solutions according to the present invention will be further provided and described.

Advantageous Effects

A pouch-shaped battery case having a hidden-type gas pocket according to the present invention, a pouch-shaped secondary battery including the same, and a battery module including the same have effects in that, when gas is generated from an electrode assembly, the gas pocket, which is maintained in a folded state, is unfolded or expanded to form a gas reception space, whereby it is possible to reduce the extent of swelling of the battery case when the gas is generated, and in particular, the gas pocket is configured so as to occupy little space in a normal state and to be unfolded to form the gas reception space only when the gas is generated, whereby it is possible to improve the efficiency of utilization of space in the battery.

DESCRIPTION OF DRAWINGS

FIGS. 1 to 4 are views showing a pouch-shaped secondary battery having a hidden-type gas pocket according to a first embodiment of the present invention, wherein FIG. 1 is a perspective view, FIG. 2 is a sectional view taken along line A-A of FIG. 1, FIG. 3 is front views showing the operation of the gas pocket, and FIG. 4 is sectional views taken along lines B-B, C-C, and D-D of FIG. 3;

FIGS. 5 and 6 are views showing a pouch-shaped secondary battery having a hidden-type gas pocket according to a second embodiment of the present invention, wherein FIG. 5 is a cross-sectional view, and FIG. 6 is sectional views of principal parts showing the operation of the gas pocket;

BEST MODE

Hereinafter, exemplary embodiments of the present invention will be described with reference to the accompanying drawings.

Figure 1:
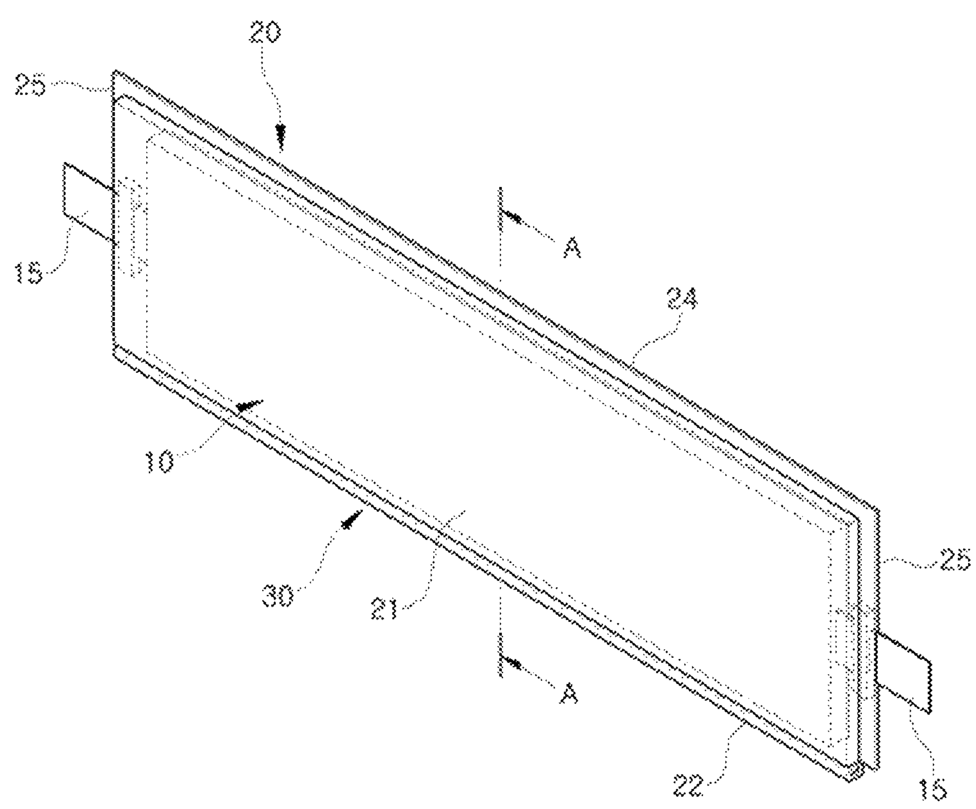
Figure 2:
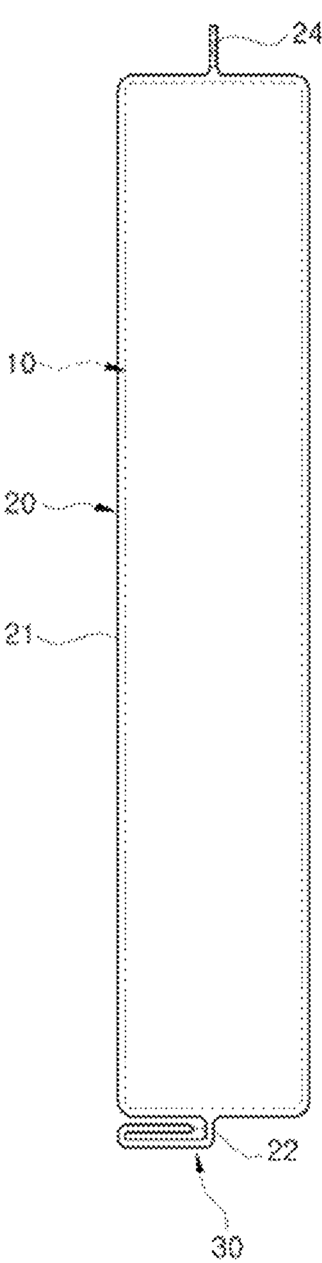
Figure 3:
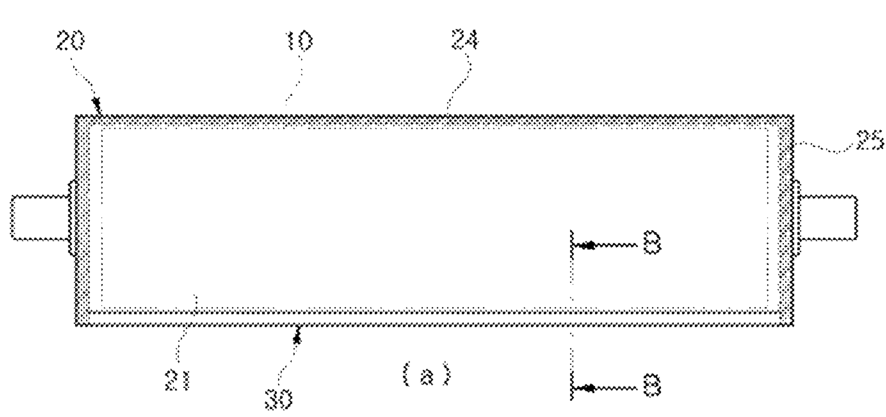
Figure 3:
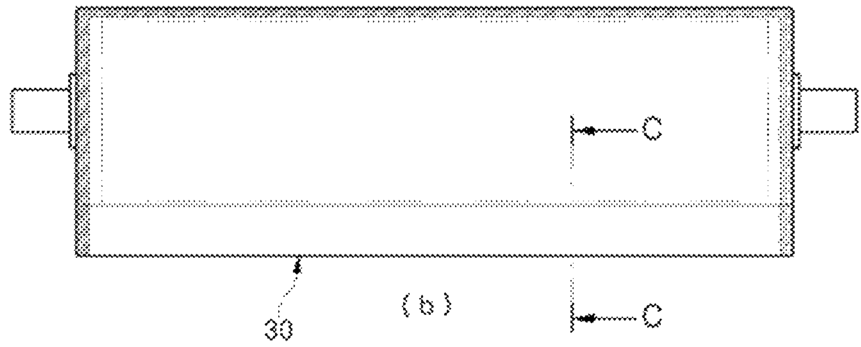
Figure 3:
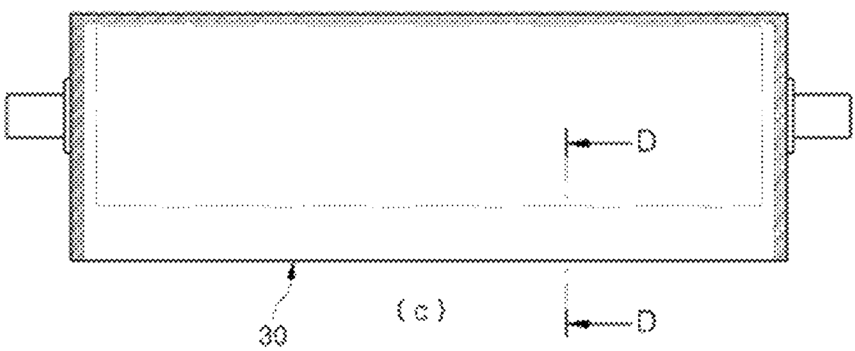
Figure 4:
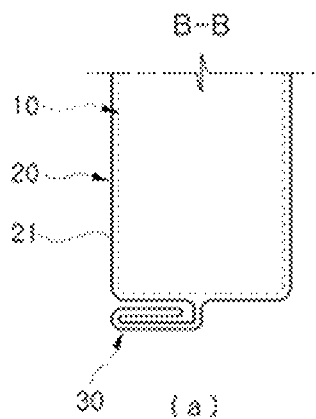
Figure 4:
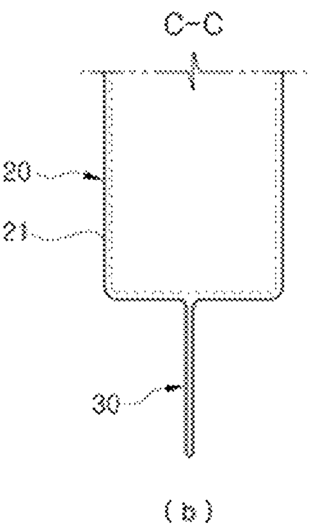
Figure 4:
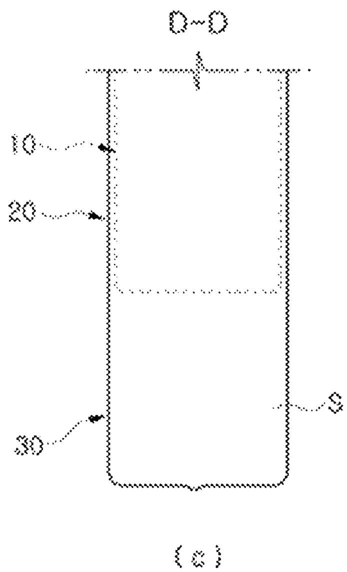

FIGS. 1 to 4 are views showing a pouch-shaped secondary battery having a hidden-type gas pocket according to a first embodiment of the present invention, wherein FIG. 1 is a perspective view, FIG. 2 is a sectional view taken along line A-A of FIG. 1, FIG. 3 is front views showing the operation of the gas pocket, and FIG. 4 is sectional views taken along lines B-B, C-C, and D-D of FIG. 3.

As shown in FIGS. 1 to 4, the pouch-shaped secondary battery having the hidden-type gas pocket according to the first embodiment of the present invention includes an electrode assembly 10 and a pouch-shaped case 20 configured to receive the electrode assembly 10. In addition, the secondary battery is configured such that electrode leads 15 are exposed out of the pouch-shaped case 20.

Here, the electrode assembly 10 is a power-generating element configured to have a structure including a positive electrode, a negative electrode, and a separator interposed between the two electrodes. The electrode assembly 10 may be constructed using a well-known electrode assembly 10, and therefore a detailed description thereof will be omitted.

The pouch-shaped case 20 may be made of a laminate sheet configured to cover the outside of the electrode assembly 10 in a sealed state. Preferably, the laminate sheet is made of a metal material, such as aluminum.

The structure in which the electrode assembly 10 is sealed using the pouch-shaped case 20 may be variously constructed. In this embodiment, the pouch-shaped case 20 has a quadrangular sealing structure, since the electrode assembly 10 generally has a quadrangular planar structure.

This pouch-shaped case 20 is configured to have a structure in which an approximately middle portion thereof is folded, the electrode assembly 10 is located therebetween, and the other open three perimetric surfaces thereof are sealed except for the folded portion. Consequently, the pouch-shaped case 20 covers the upper surface and the lower surface of the electrode assembly 10 in the state in which the electrode assembly 10 is located therein, and the four perimetric surfaces of the pouch-shaped case, which constitute a quadrangular plane, include a single surface 22 that is folded (hereinafter, also referred to as a 'folded surface') and three surfaces 24 and 25 that are attached by sealing (hereinafter, also referred to as 'sealed surfaces').

Here, the sealed surfaces 24 and 25 may be portions that are sealed by adhering the overlapping portions of the laminate sheet constituting the pouch-shaped case 20 closely to each other by thermal welding.

In particular, a gas pocket 30 configured to collect gas generated from the electrode assembly 10 due to various causes is provided at the folded surface 22 of the pouch-shaped case 20. The gas pocket 30 will be described hereinafter in detail with reference to FIGS. 2 to 4.

Meanwhile, FIG. 1 illustrates the structure in which the electrode leads 15 are installed at opposite ends of the pouch-shaped case 20 so as to be exposed. However, the direction in which the electrode leads 15 are exposed and the number of electrode leads 15 may be variously changed depending on the embodiment conditions. For example, both the electrode leads 15 may be exposed at one end of the pouch-shaped case 20.

Now, the gas pocket 30 will be described below in detail with reference to FIGS. 2 to 4.

In this embodiment, the gas pocket 30 is provided at the folded surface 22 of the pouch-shaped case 20. The gas pocket 30 is configured such that the gas pocket 30 is maintained in a folded state at the side surface of the pouch-shaped case 20 and such that, when gas is generated in the pouch-shaped case 20, the gas pocket 30 is unfolded to form a space configured to collect the gas.

Referring to FIG. 2 and the like, the folded structure of the gas pocket 30 is configured to have a structure in which the gas pocket 30 is provided at the folded surface 22 of the pouch-shaped case 20 connected to a case main body 21, in which the electrode assembly 10 is mounted, in which the gas pocket 30 is formed so as to be bent multiple times, like a rolled structure, in the state in which the folded surface 22 is in tight contact in a double-folded state, and in which the gas pocket 30 is in tight contact with the side surface of the case main body 21 in this state.

Referring to the figures showing the present embodiment, the gas pocket 30 is configured to have a structure in which the gas pocket 30 is bent two or three times from the middle portion of the side surface of the case main body 21 and is then in tight contact with the side surface of the case main body 21.

For reference, in all the figures showing the embodiment of the present invention, the folded structure of the gas pocket 30 is somewhat widened. However, the gas pocket 30 is shown as described above in order to clearly show the folded structure thereof. Consequently, it is desirable to understand that the folded portions of the gas pocket 20 are assembled in the state of being in tight contact with each other or with the case main body 21.

The gas pocket 30 may be configured such that the pouch-shaped case 20 is bent in the state of being simply in tight contact in a double-folded structure and is then in tight contact with the side surface of the case main body 21. As needed, however, the overlapping portions, among the portions constituting the gas pocket 30, may be sealed at low strength, and may then be brought into tight contact with the side surface of the case main body 21. At this time, the sealing strength of the gas pocket 30 may be lower than the sealing strength of the other three sealed surfaces 24 and 25 by a predetermined level such that, when gas is generated in the pouch-shaped case, the sealed portion of the gas pocket 30 is widened to collect the gas.

The process of collecting the gas generated in the pouch-shaped case using the gas pocket 30 will be described with reference to FIGS. 3 and 4.

FIGS. 3(*a*) and 4(*a*) show the state of the gas pocket 30 in the normal state, i.e. when no gas is generated. The gas pocket 30 is in tight contact with the side surface of the case main body 21 in an initially assembled state, i.e. in a folded state. At this time, the gas pocket 30 occupies only the external volume corresponding to the size of the laminate sheet that is bent multiple times and is then in tight contact, whereby the overall size of the battery is scarcely increased.

When gas is generated in the battery in the state in which the gas pocket 30 is folded as described above, as shown in FIGS. 3(*b*) and 4(*b*), the gas is introduced into the gas pocket 30, whereby the folded gas pocket 30 starts to be unfolded. In the figures, the state in which the gas pocket 30 is unfolded in a straight line is illustrated for the sake of convenience. However, the gas pocket 30 may be unfolded in various shapes depending on several conditions. For example, the gas pocket 30 may expand while being unfolded from the entrance thereof, or the bent portion of the gas pocket 30 may be unfolded later.

Subsequently, when gas is continuously generated in the battery, the gas pocket 30 continuously swells. When the gas pocket 30 fully swells, as shown in FIGS. 3(*c*) and 4(*c*), the gas pocket 30 expands at the side surface of the battery to form a maximum gas collection space S.

The maximum gas collection space S in the gas pocket 30 may be appropriately set depending on embodiment conditions. By the provision of the gas pocket 30, it is possible to minimize the deformation of the remaining portion of the battery, excluding the portion of the battery at which the gas pocket is located, when gas is generated in the battery. In particular, it is possible to sufficiently secure the gas collection space, whereby it is possible to prevent explosion of the battery.

Hereinafter, various embodiments of the gas pocket according to the present invention will be described. For reference, components of the following embodiments that are identical or similar to the components of the first embodiment are denoted by the same reference numerals, a duplicate description thereof will be omitted if possible, and a description will be given based on components of the following embodiments that are different from the components of the first embodiment.

Figure 5:
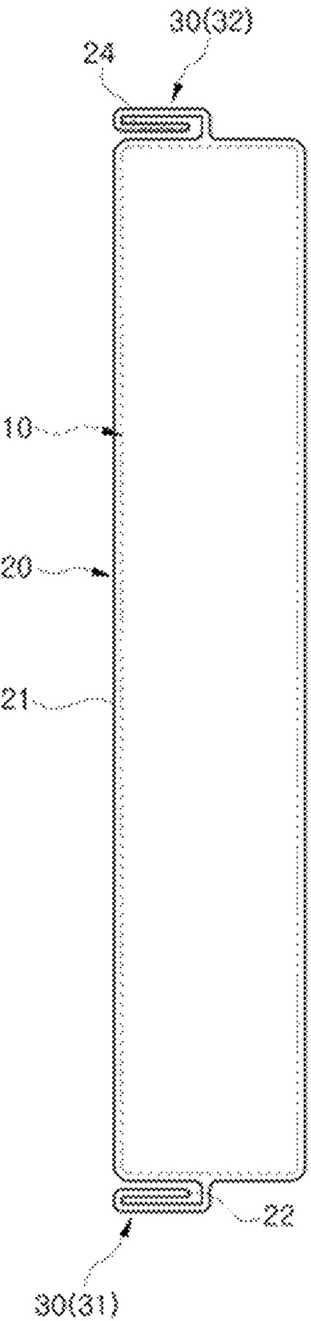
Figure 6:
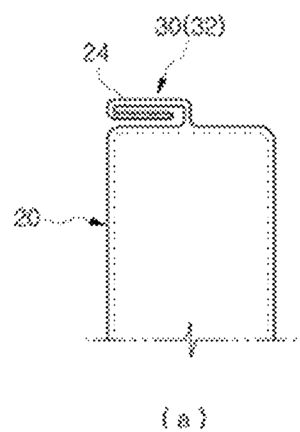
Figure 6:
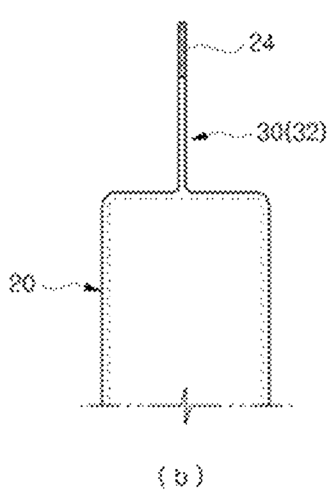
Figure 6:
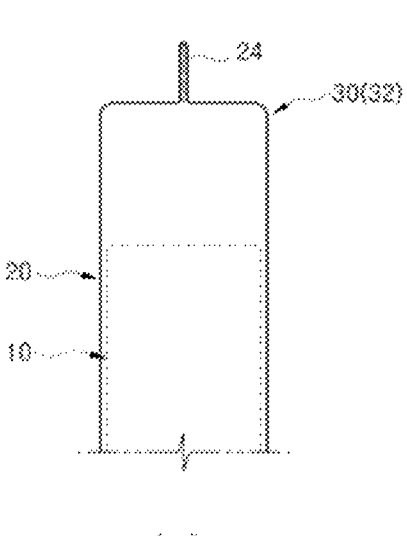

FIGS. 5 and 6 are views showing a pouch-shaped secondary battery having a hidden-type gas pocket according to a second embodiment of the present invention, wherein FIG. 5 is a cross-sectional view and FIG. 6 is sectional views of principal parts showing the operation of the gas pocket.

In the first embodiment of the present invention previously described, the gas pocket 30 is provided only at the folded portion of the pouch-shaped case 20, i.e. the folded surface 22. In the second embodiment of the present invention, however, the construction in which the gas pocket 30 may also be formed at the sealed portion of the pouch-shaped case 20, i.e. the sealed surface 24, is shown.

That is, referring to FIGS. 5 and 6, the gas pocket 30 according to the second embodiment of the present invention may be provided at opposite sides of the pouch-shaped case 20. At this time, since the one side surface of the pouch-shaped case 20 is the folded surface 22 and the other side surface of the pouch-shaped case 20 is the sealed surface 24, a gas pocket 31 at the folded surface 22 may be configured as in the first embodiment, which was previously described, and a gas pocket 32 at the sealed surface 24 may be configured such that only the ends of the double-folded portions of the gas pocket are joined by sealing and the remainder of the double-folded portions of the gas pocket are folded in the state of being in tight contact with each other in order to constitute the gas pocket 30.

Here, it may be considered that the sealed surface 24, at which the gas pocket 32 is formed, is formed so as to have a smaller width of the sealing attachment surface than the other sealed surfaces 25 (see FIG. 1), at which no gas pocket 30 is formed. This serves to enlarge the gas collection space of the gas pocket 32 while the sealing area thereof is minimized.

FIGS. 6(*a*), 6(*b*), and 6(*c*) sequentially show the folded and assembled state of the gas pocket 32, the state in which the gas pocket 32 starts to be unfolded, and the maximum gas collection state of the gas pocket 32.

In the structure in which the gas pocket 32 is also formed at the sealed surface 24 of the pouch-shaped case 20, as described above, the gas pocket 30 may not be formed at the folded surface 22 of the pouch-shaped case 20, and the gas pocket 32 may be formed at only the sealed surface 24 of the pouch-shaped case 20. In addition, in the case in which the pouch-shaped case 20 is constituted by two laminate sheets and thus all surfaces of the pouch-shaped case are attached to each other by sealing without being folded, the gas pocket 32 shown in FIG. 6(*a*) may be provided at at least one sealed surface of the pouch-shaped case.

Figure 7:
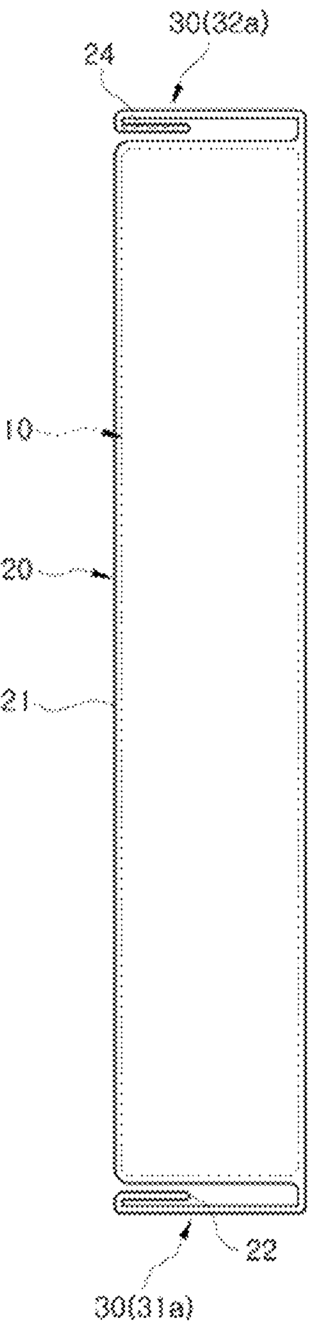
FIG. 7 is a cross-sectional view showing a pouch-shaped secondary battery having a hidden-type gas pocket according to a third embodiment of the present invention.

FIG. 7 is a cross-sectional view showing a pouch-shaped secondary battery having a hidden-type gas pocket according to a third embodiment of the present invention. Unlike the previously described first and second embodiments of the present invention, in each of which the gas pocket 30 starts to be formed from the middle portion of the side surface of the battery, this embodiment is configured to have a structure in which a gas pocket 30 starts to be formed at the corner at which the side surface of the pouch-shaped case 20 meets another surface (the upper surface or the lower surface) of the pouch-shaped case and is then folded so as to cover the side surface of the battery.

The gas pocket 30 (31*a* and 32*a*) may be formed at one of the opposite side surfaces of the battery.

The other components of this embodiment may be configured so as to be identical or similar to the components of the embodiments that were previously described, and therefore a duplicate description thereof will be omitted.

Figure 8:
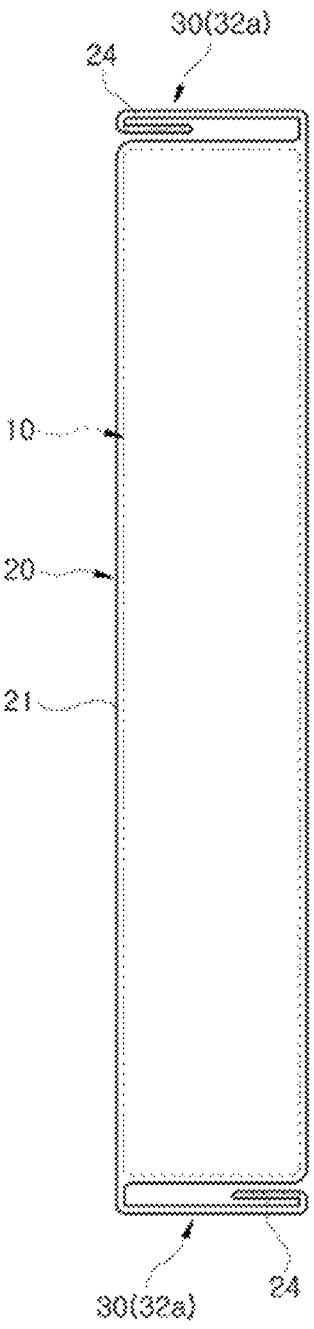
FIG. 8 is a cross-sectional view showing a pouch-shaped secondary battery having a hidden-type gas pocket according to a fourth embodiment of the present invention.

FIG. 8 is a cross-sectional view showing a pouch-shaped secondary battery having a hidden-type gas pocket according to a fourth embodiment of the present invention. This embodiment is similar in construction to the third embodiment, except that, in the case in which sealed surfaces 24 are formed at both opposite sides of the battery, a gas pocket 32*a* is provided at each of the sealed surfaces 24.

In addition, the opposite gas pockets 32*a* start to be formed from opposite sides in the diagonal direction.

Figure 9:
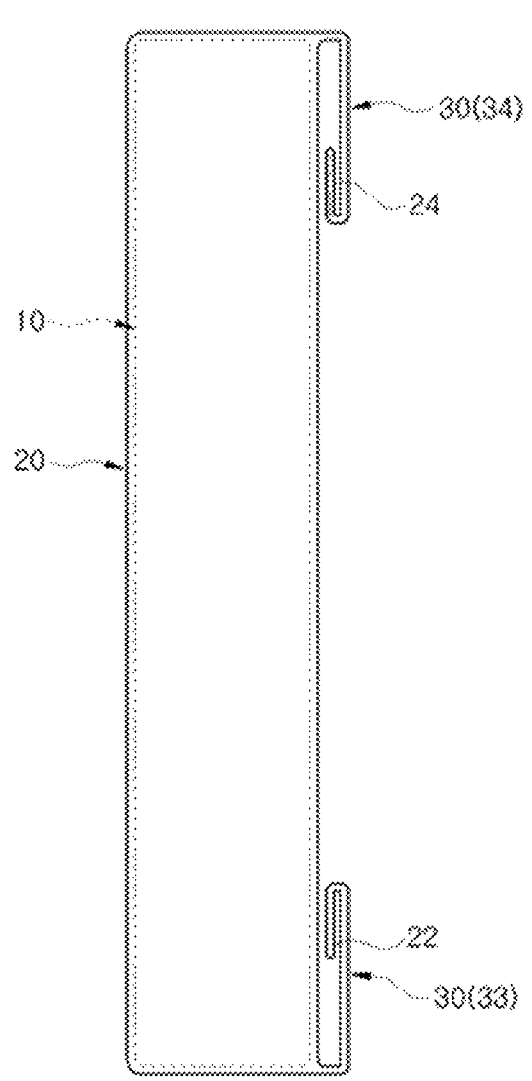
FIG. 9 is a cross-sectional view showing a pouch-shaped secondary battery having a hidden-type gas pocket according to a fifth embodiment of the present invention.

FIG. 9 is a cross-sectional view showing a pouch-shaped secondary battery having a hidden-type gas pocket according to a fifth embodiment of the present invention. Unlike the embodiments previously described, a gas pocket 30 is formed as the result of being bent toward the upper surface or the lower surface of the battery, rather than toward the side surface of the battery.

In this embodiment, the gas pocket 30 (33 and 34) may be formed at only one of the opposite sides of the battery.

Figure 10:
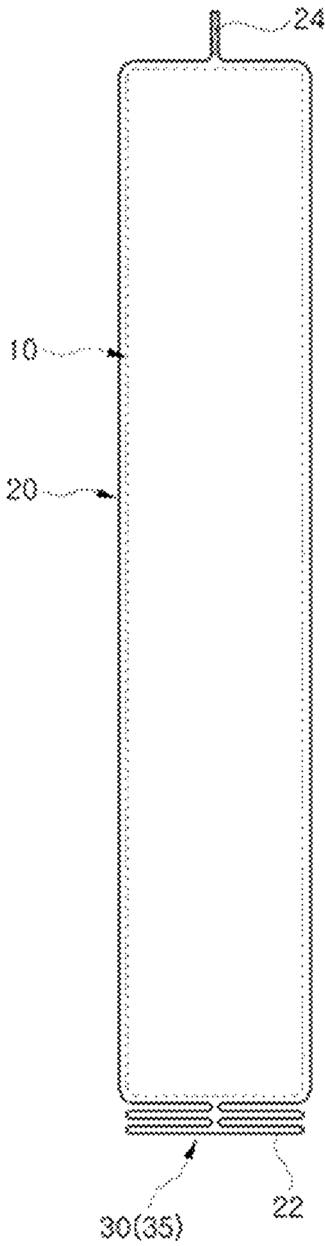
FIG. 10 is a cross-sectional view showing a pouch-shaped secondary battery having a hidden-type gas pocket according to a sixth embodiment of the present invention.

FIG. 10 is a cross-sectional view showing a pouch-shaped secondary battery having a hidden-type gas pocket according to a sixth embodiment of the present invention. This embodiment shows the construction in which a gas pocket 30 is formed at the side surface of the battery so as to have a bellows structure.

In this embodiment, a gas pocket 35 having the same structure may be formed at the sealed surface of the battery, or the gas pocket 35 may be formed at opposite sides of the battery.

In addition, since the gas pocket 35 is formed so as to have a bellows structure, bellows parts constituting the bellows structure may be attached to each other via an adhesive member such that the gas pocket 35 is stably fixed in tight contact with the side surface of the battery before gas is generated.

Meanwhile, a battery module may be configured to include one or more pouch-shaped secondary batteries described above. The battery module is configured to include at least one pouch-shaped secondary battery cell. A plurality of pouch-shaped secondary battery cells may be combined in order to constitute the battery module. In addition, a plurality of battery modules may be combined in order to manufacture a battery pack.

The technical ideas described with reference to the above-described embodiments of the present invention may be embodied independently or in a combined state. In addition, although the present invention has been described with reference to the embodiments disclosed in the drawings and the detailed description of the invention, the embodiments are merely illustrative. Those skilled in the art to which the present invention pertains will appreciate that various modifications and other equivalent embodiments can be devised based on the embodiments described above. Therefore, the technical protection scope of the present invention is to be defined by the appended claims.

The invention claimed is:

1. A method of forming a pouch-shaped secondary battery, comprising:

folding a single laminate sheet at a fold so as to define a pouch-shaped case having an upper portion and a lower portion on opposing sides of the fold, the upper and lower portions being integrally joined by an intermediate portion therebetween, the intermediate portion containing the fold, and the pouch-shaped case receiving and enclosing an electrode assembly between the upper and lower portions;

sealing the electrode assembly within the pouch-shaped case by adhering contacting edges of the upper and lower portions to one another along an adhered interface; and contracting a gas pocket enveloped by the intermediate portion of the pouch-shaped case and the fold into an initial contracted configuration in which at least a portion of the gas pocket is contracted towards the electrode assembly, wherein the gas pocket is not sealed or is sealed with a predetermined lower sealing strength than a sealing strength of the adhered interface between the upper portion and the lower portion, wherein the pouch-shaped case comprises a case main body, in which the electrode assembly is received, with the gas pocket being positioned to one side of the case main body, and wherein the step of contracting the gas pocket into the initial configuration comprises bending the intermediate portion of the pouch-shaped case, which envelops the gas pocket, into contact with the case main body, and wherein the intermediate portion is configured such that, when gas is generated in the pouch-shaped case, the gas pocket expands away from the electrode assembly into an expanded configuration forming an enlarged space for collecting the generated gas, wherein a first surface of the gas pocket is defined by the fold, and wherein the gas pocket is configured to contain the generated gas inside the pouch-shaped case.

2. The method of claim 1, wherein the intermediate portion extends along a first side of the electrode assembly, and wherein the adhering of the contacting edges to one another along the adhered interface is such that a complete perimeter of the pouch-shaped case encircling the electrode assembly in a first plane is closed, the complete perimeter being defined by a combination of the intermediate portion extending along the first side of the electrode assembly and the adhered interface extending along the other sides of the electrode assembly other than the first side.

3. The method of claim 2, wherein the pouch-shaped case defines a first cross sectional area within the first plane when the intermediate portion is in the initial contracted configuration, and wherein the intermediate portion is configured such that the pouch-shaped case defines a second cross sectional area within the first plane when the intermediate portion is in the expanded configuration, the second cross sectional area being larger than the first cross sectional area.

4. The method of claim 2, wherein the pouch-shaped case has a planar, quadrangular structure defining the complete perimeter, such that the complete perimeter is defined by the adhered interface along three sides of the quadrangular structure and by the fold along a fourth side of the quadrangular structure.

5. The method of claim 1, wherein bending the intermediate portion into contact with the case main body comprises bending the intermediate portion multiple times into contact with the case main body.

6. The method of claim 1, wherein bending the intermediate portion into contact with the case main body comprises bending the intermediate portion into a bellows structure that is in contact with the case main body.

7. The method of claim 6, wherein bending the intermediate portion into the bellows structure comprises attaching portions of the bellows structure to each other via an adhesive.

8. The method of claim 1, wherein the case main body includes opposing upper and lower surfaces joined together by side surfaces that project transversely to the upper and lower surfaces and extend around a perimeter of the upper and lower surfaces, and wherein bending the intermediate portion into contact with the case main body comprises bending the intermediate portion into contact with at least one of the side surfaces of the case main body.

9. The method of claim 8, wherein the gas pocket is connected to the case main body along one of the side surfaces at an intermediate location between the upper and lower surfaces.

10. The method of claim 8, wherein the gas pocket is connected to the case main body along an edge where a first one of the side surfaces meets either the upper surface or the lower surface.

11. The method of claim 1, wherein the case main body includes opposing upper and lower surfaces joined together by side surfaces that project transversely to the upper and lower surfaces and extend around a perimeter of the upper and lower surfaces, and wherein bending the intermediate portion into contact with the case main body comprises bending the intermediate portion into contact with the upper surface or the lower surface of the case main body.

12. The method of claim 11, wherein the gas pocket is connected to the case main body along an edge where a first one of the side surfaces meets either the upper surface or the lower surface of the case main body into which the intermediate portion is bent into contact.

13. The method of claim 1, further comprising contracting a second gas pocket towards the electrode assembly, the second gas pocket being arranged at an opposite side of the pouch-shaped case from the gas pocket enveloped by the intermediate portion.

14. The method of claim 1, wherein the adhering of the contacting edges to one another comprises adhering the contacting edges of the upper and lower portions to one another by thermal welding.

15. A method of forming a battery module, comprising: combining a plurality of pouch-shaped secondary batteries, each of the plurality of pouch-shaped secondary batteries being formed by the method of claim 1.

16. A method of forming a battery pack, comprising: combining a plurality of battery modules, each of the plurality of battery modules being formed by the method of claim 15.

17. The method of claim 1, wherein, when in the initial configuration, an outer surface of the intermediate portion is in contact with an outer surface of the case main body.

18. The method of claim 1, wherein, when in the initial configuration, the intermediate portion of the pouch shaped-case is at least double folded and an outer surface of the intermediate portion is in contact with an outer surface of the case main body.

* * * * *